United States Patent [19]

Frisz et al.

[11] 3,944,086
[45] Mar. 16, 1976

[54] MATERIAL HANDLING FACILITY AND APPARATUS THEREFOR

[75] Inventors: James O. Frisz, Los Angeles; Harold A. Price, Anaheim, both of Calif.

[73] Assignee: Watson Industrial Properties, Los Angeles, Calif.

[22] Filed: Aug. 19, 1974

[21] Appl. No.: 498,762

[52] U.S. Cl. .............................. 214/17 DA; 198/36
[51] Int. Cl.² .................. B65G 65/42; B65G 65/46
[58] Field of Search ........ 214/17 D, 17 DA, 17 DB, 214/10, 15 E; 198/7 R, 36, 9, 59, 110, 170, 213

[56] References Cited
UNITED STATES PATENTS

| | | | |
|---|---|---|---|
| 2,548,709 | 4/1951 | Drexler | 198/110 X |
| 2,562,427 | 7/1951 | Hurter | 214/17 DA |
| 2,579,153 | 12/1951 | Meissner | 214/10 X |
| 2,693,873 | 11/1954 | Martin | 198/213 |
| 3,229,828 | 1/1966 | Kucera | 198/170 X |
| 3,476,272 | 11/1969 | Puta | 214/17 DB |
| 3,604,574 | 9/1971 | Leitch | 214/15 E |

Primary Examiner—Robert G. Sheridan
Attorney, Agent, or Firm—George J. Netter

[57] ABSTRACT

A pair of elongated, parallel pits receive materials for handling. Just inwardly of each pit there is located a parallel running belt conveyor. Feeder vehicles mounted on rails in the pits outwardly of the belt conveyors are powered to traverse the pits lengthwise with each including a screw feeder for moving the materials from the pits onto the belt conveyors. Further apparatus on the feeder vehicles moves substantially vertically through the materials in the pits as the vehicles move therealong to break up any clumping of the materials (e.g., bagged material) to facilitate operations of the screw feeders. Control equipment is provided such that if a feeder vehicle encounters an object it cannot move, then the vehicle moves back a certain amount and an alarm is given, after which the vehicle makes another attempt to feed the object. This process will continue until either the object is removed and/or the operator resets the equipment as provided for. Also, the vehicles are controlled to exert a constant pressure against the materials being handled and therefore will move faster through lightly loaded areas than through heavily loaded ones.

4 Claims, 5 Drawing Figures

MATERIAL HANDLING FACILITY AND APPARATUS THEREFOR

The present invention pertains generally to a material handling facility, and, more particularly, to equipment for initially receiving and temporarily storing materials such as waste materials on a quantity basis and then moving them onto conveying apparatus for transport to one or more stations for further processing.

BACKGROUND OF THE INVENTION

The handling and disposal of such materials as waste materials, particularly in urban areas, is becoming increasingly more difficult and at the same time requiring accomplishment in as short a period as practicable. With the growth in population and the corresponding urban growth, the quantity of such materials to be handled is accordingly increased. Moreover, the kinds of materials are considerable, e.g., paper, metal, plastic, wood chips, rock products and manufactured items as found in solid wastes, for example. In addition, although some value may be obtained via reclaiming a portion of solid wastes, for example, the overall cost of handling must be kept as low as possible.

Irrespective of processing techniques employed, the materials reference above are usually collected by trucks for delivery to a facility where they are unloaded at one or more specific locations at the facility. Since the entire throughput for the facility must be handled at these unloading sites, the equipment must be unusually reliable, since a total breakdown for even a relatively short time, could quickly result in an undesirably large accumulation of materials. In operation, the equipment at the unloading site must be able to break up clumps of materials that form during unloading and then move them to other stations for processing.

Although, as already alluded to, the apparatus and facility of this invention can be usefully employed with materials of great variety, the apparatus and facility will be described herein particularly in connection with the handling of solid wastes.

OBJECTS AND SUMMARY OF THE INVENTION

It is, therefore, a primary aim and object of the present invention to provide an improved unloading site in a bulk storage and handling facility (e.g., waste disposal facility) with storage pits and apparatus for moving through the so-stored materials and transferring them to one or more conveyors.

A further object is the provision of an unloading site and apparatus as in the above object in which as said apparatus moves through the wastes in a first direction, other means move transversely thereto, breaking up aggregated materials.

The above described and other objects of this invention are accomplished by providing a pair of elongated, parallel, spaced pits into which materials are unloaded. Just inwardly of each pit there is located a parallel running belt conveyor. A pair of feeder vehicles mounted on rails in the pits outwardly of the belt conveyors are powered to traverse the pits lengthwise at predetermined speeds and include respective screw feeders for moving the materials from the pits onto the belt conveyors. Further apparatus on the feeder vehicles moves substantially vertically through the materials in the pits as the vehicles move therealong to break up any clumping of the materials (e.g., bagged material) and thereby facilitate operation of the screw feeders.

Control equipment is provided such that if a feeder vehicle encounters an object it cannot move, then the vehicle moves back a certain amount and an alarm is given. The vehicle then makes another attempt to feed the object. This process will continue until either the object is removed and/or the operator resets the equipment as provided for.

The vehicles are controlled to exert a constant pressure against the materials being handled and therefore will move faster through lightly loaded areas than through heavily loaded ones.

DESCRIPTION OF A PREFERRED EMBODIMENT

Figure 1:
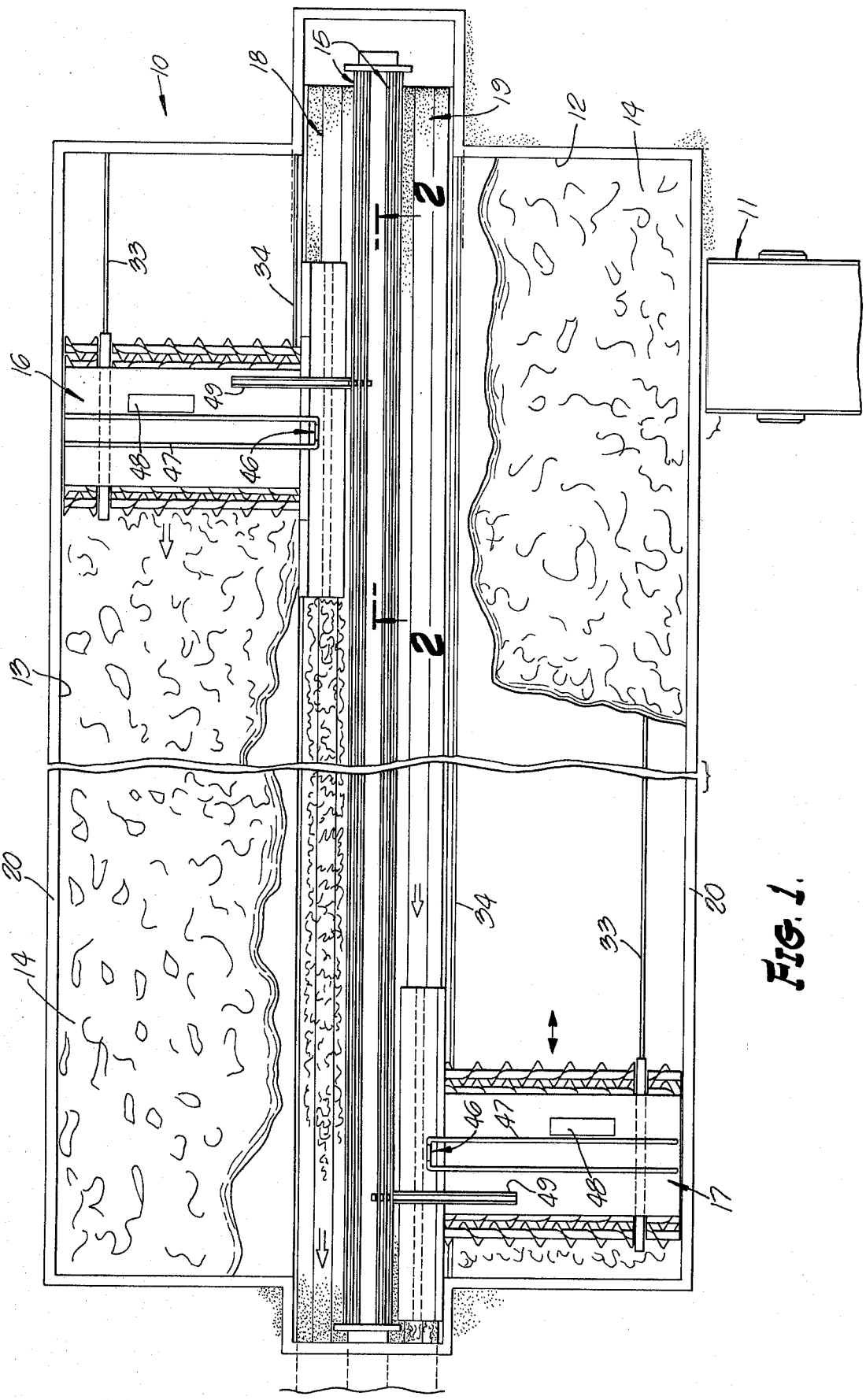
FIG. 1 is a plan view of an unloading site at a waste disposal facility, showing the apparatus of the invention.

With reference now to FIG. 1 of the drawing, there is shown there an unloading site at a waste disposal facility identified generally as at 10. That is, the site 10 is the first stage in the waste disposal process at the facility and has as a primary function the receipt and temporary storage of wastes unloaded from trucks 11.

The site 10 includes a pair of open top, elongated, parallel, spaced pits 12 and 13, the upper surfaces of which are either at ground level or at a convenient height above ground level so that dumping of wastes 14 therein from the trucks may be easily accomplished. Guide track framework 15 for electrical power (if desired) is located in the space between the pits. Two feeder vehicles 16 and 17 are arranged for traversing movement along each of the pits. In a way that will be more particularly described, the feeder vehicles transfer waste materials from the pits to belt conveyors 18 and 19 located in the space between the pits, for conveying them to other processing stations of the facility.

Figure 2:
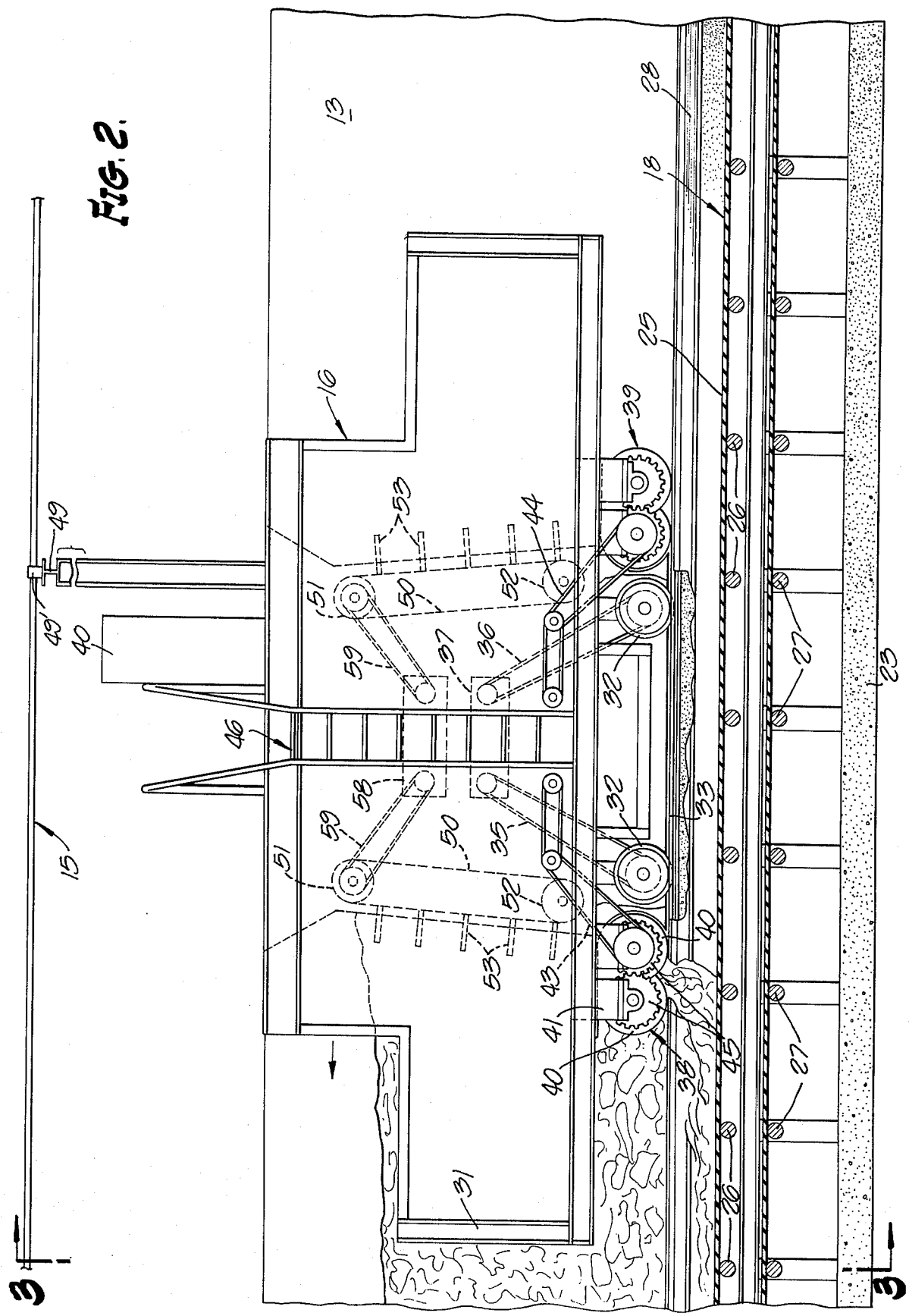
FIG. 2 is a side elevational, sectional view taken along the line 2—2 of FIG. 1.
Figure 3:
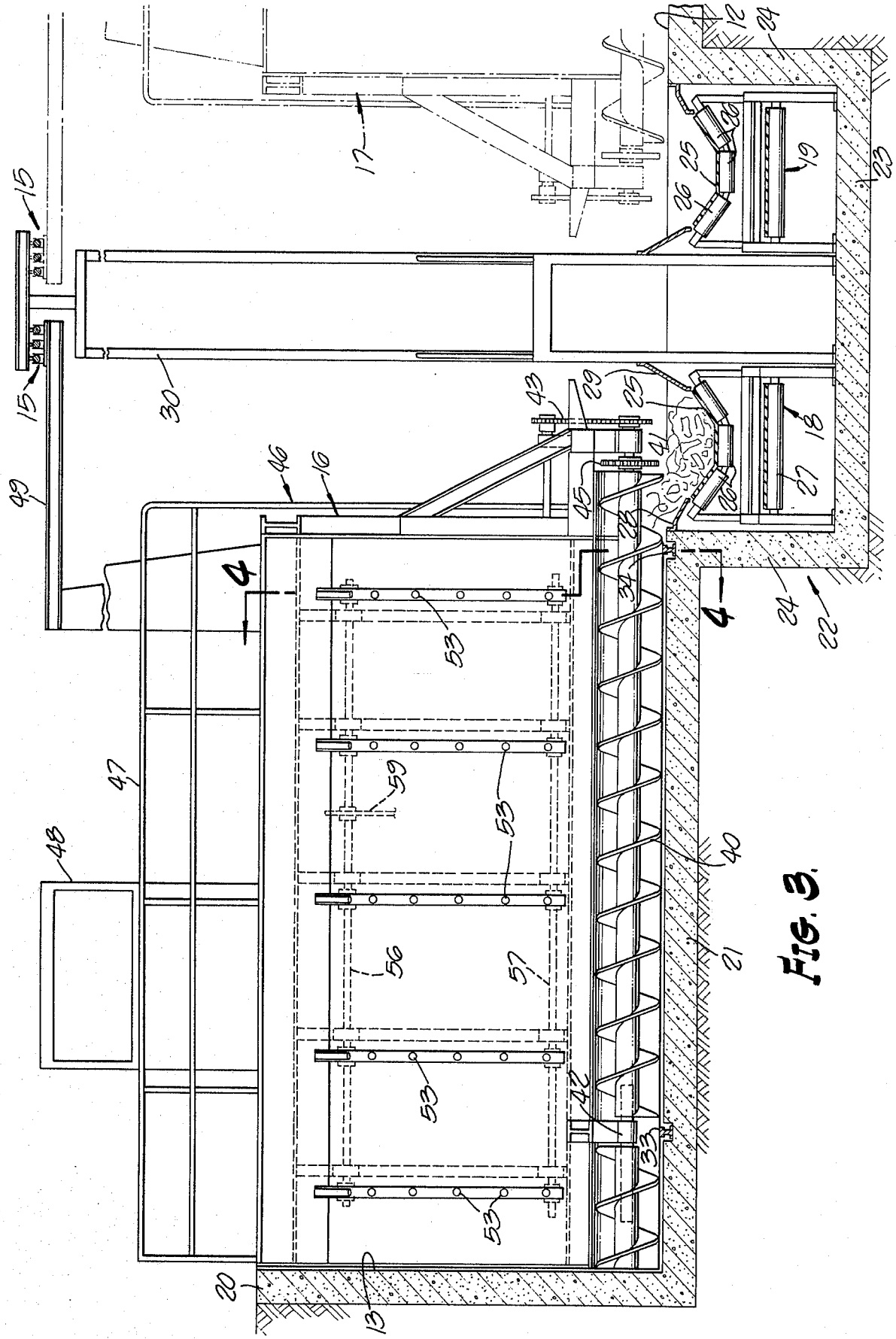
FIG. 3 is an end elevational, sectional view taken along the line 3—3 of FIG. 2.

Turning now simultaneously to FIGS. 2 and 3, it is seen that the pit 13 is defined by vertical side and horizontal bottom walls 20 and 21, respectively, with the space between the pits on which the guide track framework is mounted, being enumerated generally as 22. This space defines a bottom wall 23 below 21 and vertical walls 24 interconnecting therewith.

The conveyors 18 and 19 are located immediately adjacent the walls 24 and are supportively mounted on the bottom or floor wall 23. More particularly, each of these conveyors includes a continuous belt 25 mounted on an upper set of rollers 26 forming a troughlike conveying surface extending along the side of the associated pit and slightly below the pit bottom wall 21. A further set of rollers 27, located below the rollers 26, provides a return path for the belt 25. A slide plate 28 affixed to the inner surface of wall 24 extends downwardly to the belt edge and serves to guide materials directly onto the belt, thereby preventing them from dropping between the belt and the wall 24. Similarly, a so-called splash pan is affixed to support framework 30 and extends to the other belt edge, preventing spillover of materials from the belt.

The feeder vehicles 16 and 17 are identical in construction, and for that reason only the vehicle 16 will be described in detail. Still referring to FIGS. 2 and 3, each such vehicle includes an open frame chassis 31 mounted on wheels 32 which are adapted to ride on rails 33 and 34 arranged on the bottom wall 21 and extending longitudinally thereof. Rotative power is provided to the four wheels via a pair of drive chains 35 and 36 interconnected with a suitable power source 37. More particularly, in the usual operation, only one pair of wheels are driven at a time. For example, when it is desired to drive the vehicle to the left as shown in FIG. 2, only the drive chain 35 is powered; and when to the right, only drive chain 36 is powered. Accordingly, by control means to be described, the vehicles are made to traverse the path of movement along the pit in either longitudinal direction.

Longitudinally outwardly of the wheels 32 there are provided two sets of paired screw feeders 38 and 39. Each screw feeder includes a pair of broad-threaded screws 40 (frequently referred to as Archimedes screws) with their threads or vanes intermeshed. The screws 40 of each set extend across the full width of the pit and are journaled as at 41 and 42. Drive chains 43 and 44 provide rotative power to the screw feeders 38 and 39, respectively. Moreover, the outer ends of the screws defining each feeder are interlocked together by gears 45 pinned to screw shaft ends such that in each feeder the screws rotate in opposite directions.

Each feeder vehicle also includes a ladder 46 on the side of the frame 31 via which an operator may climb up onto the top thereof where there are located a catwalk 47 and a control panel 48. As can be seen best in FIG. 3, a cantilever arm 49 provides sliding interconnection via brushes 50 carried at the upper end of 30 with electrical power, for example, to energize the rotative power source 37 and other power drive means.

As to operation of the apparatus described to this point and assuming a pit to include a quantity of materials to be handled, the associated vehicle is provided with rotative power to its wheels and then when the vehicle is moving, power is applied to the lead screw feeder. Accordingly, as the vehicle moves through the materials, the screw feeder transfers the materials to the adjacent belt conveyor under the frame 31, where they are moved to amother station for further disposal processing. When the vehicle has moved to the end of the pit, the wheel drive is automatically stopped and driven in the opposite direction in a way that will be described later. This back and forth traversal continues until the operator shuts off the power or the vehicle encounters a mass of material that cannot be transferred by the screw feeder, in which case the vehicle is automatically stopped.

The provision of two pits and two vehicles as described is important not only in affording greater waste materials handling capability, but also in the event repairs are required for one vehicle, the other can function, thereby avoiding the necessity for complete shutdown. This is particularly true in the case of a waste disposal plant, many of which operate on a 24 hour per day basis.

Figure 4:
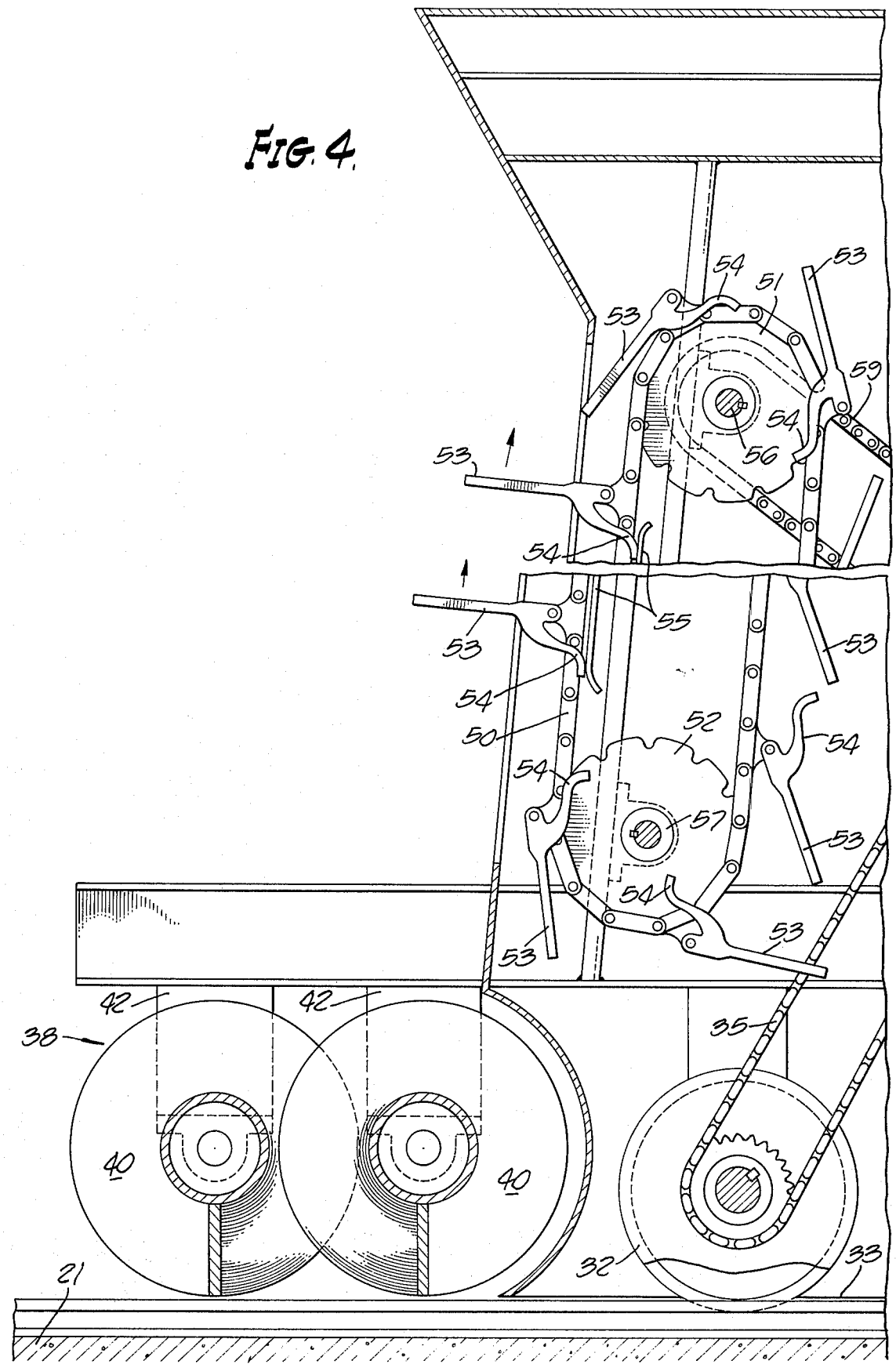
FIG. 4 is an enlarged, sectional view, partially fragmentary, showing primarily that part of the apparatus for breaking up clumps of materials, taken along the line 4—4 of FIG. 3.

In the normal course of unloading waste materials into the pits 12 and 13, these materials will frequently cluster together into clumps of a size and weight making them difficult or impossible to handle. For the ensuing description of apparatus for breaking up such clumps, reference is made simultaneously to FIGS. 2, 3 and 4. As shown there, each feeder vehicle includes a plurality of drive chains 50 arranged in a mutually spaced condition across the width of the pit and adapted for generally vertical movement through the waste materials. Each such drive chain has an upper sprocket 51 and a lower sprocket 52. A plurality of fingerlike members 53 are pivotally connected to the drive chain 50 at spaced points therealong for extension outwardly of the chain with each including an arm 54 extending from a common side of the members to the opposite or inner side of the chain. A camming plate 55 is mounted just inside that portion of the chain facing into the waste materials. This plate extends for substantially the full distance between the sprockets 51 and 52 for engaging the arms 54 as the fingers 53 move therepast and cam them to a position approximately vertical to the chain. All of the sprockets 51 and 52 are pinned in common to respective shafts 56 and 57, the latter being suitably journaled to the frame 31. Rotative power is supplied to the shaft 56 from a power source 58 via the chain 59.

In operation, as the vehicle moves through the waste materials, power is applied to the chains 50 in such direction as to vertically move that portion of the chain facing away from the vehicle and into the waste materials. As the chains move upwardly, the plate 55 cams the fingerlike members 53 outwardly of the chains, thereby engaging and moving through the waste materials, breaking up any clumps. This action also lifts materials close to the pit wall, moving them inwardly toward the belt, thereby aiding material distribution.

When the fingerlike members 53 move beyond the plate 55, they are no longer maintained fixedly extending from the chain 50 and therefore do not produce more than an inconsequential stirring of the materials.

In operation of the equipment, it is important that certain control functions be accomplishable in order that practical use is achieved. First of all, the screw feeders are controlled in a manner such that if excessive torque is encountered during feeding, driving power will be interrupted. Similarly, on occasion the fingerlike members 53 may encounter an excessive load that is beyond the handling capability of the members or the drive chain 50 and means to be described stop movement thereof in that case.

Figure 5:
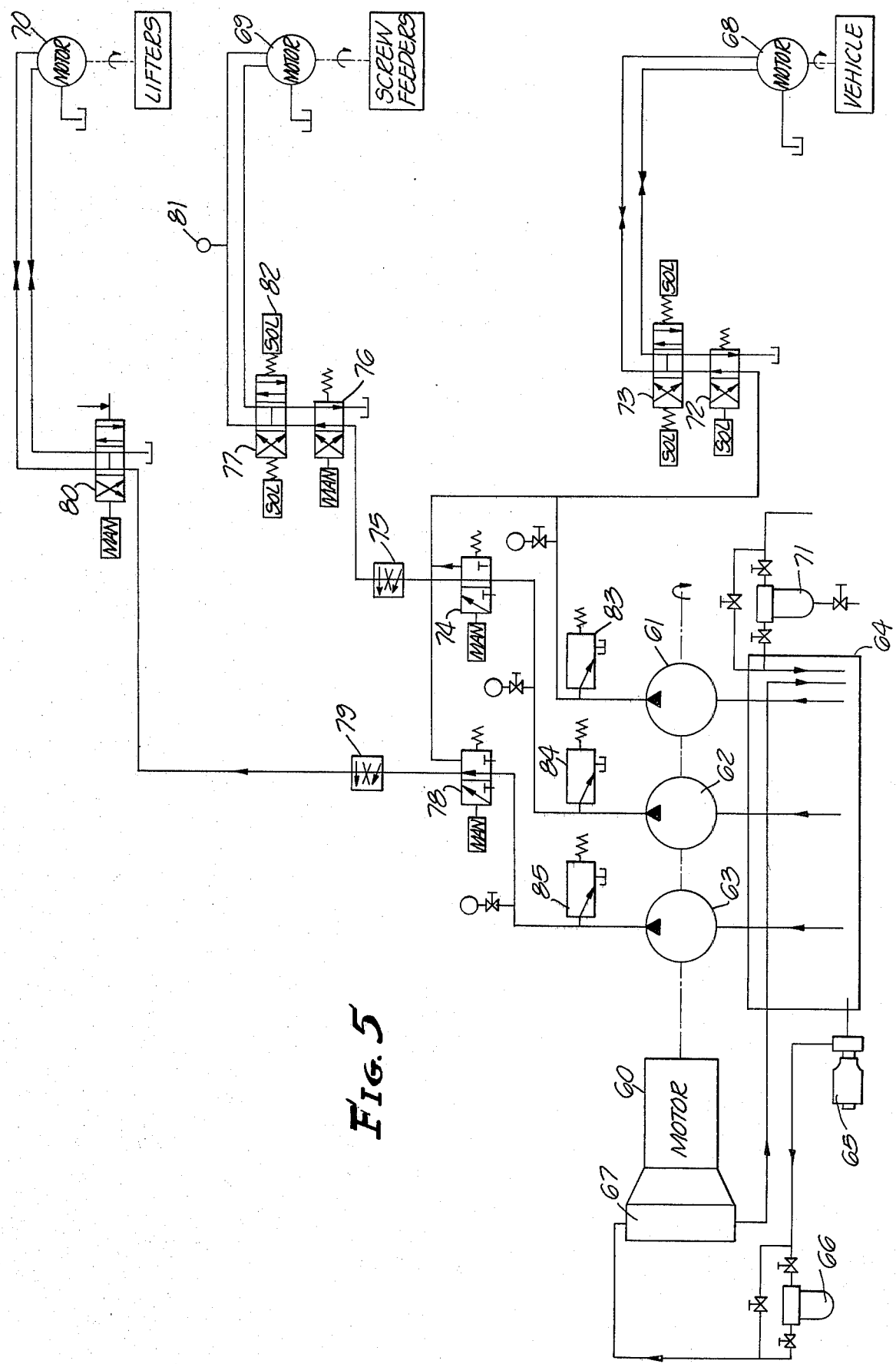
FIG. 5 is a schematic representation of the drive and control aspects of this invention.

Reference is now made to FIG. 5 for the following description of the drive means and control apparatus therefor. An electric motor 60 (or, optionally, an internal combustion engine) drives three pressure compensated hydraulic pumps 61, 62 and 63 along separate paths for powering the vehicles, screw feeders and lifters, respectively. Fluid is stored in a suitable reservoir 64, with cooling circulation provided via a pump 65, a filter 66, an oil cooler 67 driven by the motor 60, and returned to the reservoir 64.

The pump 61 is pressure compensated and provides power for the fluid motor 68 which drives the vehicle at a speed that maintains a constant pressure against the material load. Pump 62 provides pressurized fluid to fluid motor 69 for driving the screw feeders at a fixed speed irrespective of torque, up to a predetermined maximum. The pump 63 drives motor 70 and, in turn, the lifters at a constant speed as long as the loading force does not exceed a predetermined maximum.

The hydraulic fluid is returned from the various parts of the system after use and filtered at 71 before emptying into reservoir 64.

The electrical control circuits are not shown however, their operation will be manifest from the following description.

As to vehicle drive, the solenoid valves 72 and 73, depending on their respective states, can drive fluid motor 68 (and thus the vehicle) in either direction or the fluid is bypassed to the reservoir. In a practical embodiment of the invention, means were provided for manual actuation of the solenoid valves 72 and 73, as well as automatic reversal of the vehicle on its reaching the ends of the pit. That is, by means of limit switches (not shown) located at the end of each pit 12 and 13, on a vehicle reaching the end of a pit and operating the associated limit switch, the solenoid valves 72 and 73 are appropriately actuated to reverse the vehicle direction. The operator may at any time effect manual control to have either vehicle travel in either direction.

The pressurized fluid from pump 62 passes through manual control valve 74, flow control valve 75, and serially arranged valves 76 and 77 (the latter being solenoid controlled) to the screw feeder motor 69. In a way known in the art, the valves 76 and 77 may be selectively set to drive the screw feeders in either direction, or bypass the motor 69 (i.e., stop the motor). Adjustment of valve 75 controls the fluid flow to the motor 69 and thus its speed. Valve 74, when actuated bypasses all the fluid from pump 62 to the vehicle motor 68 for a purpose to be described later.

The lifter motor 70 receives the pressurized fluid from pump 63 via a manually operated valve 78, pressure control valve 79 and further manually operated triple-acting valve 80. The valve 80 is selectively adjustable to drive motor 70 and the lifters in either direction, or to bypass the fluid to the reservoir, stopping lifter drive. The rate of fluid flow and thereby the lifter speed, by valve 79 setting.

The valves 74 and 78 may, at the discretion of the operator, be actuated to add pressurized fluid from either or both pumps 62 and 63 to the vehicle drive motor 68 feed line. This provides additional driving power in the event high-speed traversal is required at a time when the lifters and screw feed are off (i.e., an empty pit, for example).

On the occasion of the screw conveyors being overloaded or locked up, a pressure switch 81 operated by the hydraulic fluid in the feed line to the motor 69 exceeding some predetermined maximum, energizes solenoid 82 which reverses the direction of drive to the screw feeders. A warning light or sound alarm (not shown) may be also energized at this time. In the usual situation, reversal for a short time unlocks the screw feeder, fluid pressure drops and the screw feeding operation begins again. Optionally, a time control may also be utilized to automatically return the locked screw feeder to the drive or material unloading mode after a given period of reversal.

Other conventional controls are also provided for safe operation of the hydraulic system, details of which are not given. For example, if temperature of the hydraulic fluid in the reservoir or sump 64 exceeds a safe value, a malfunction alarm is automatically energized.

The respective three feed lines from each of the pumps 61–63 are provided with corresponding undivided pressure relief valves 83, 84 and 85, which on the various line pressures reaching an unsafe level automatically redirect the fluid to the reservoir 64.

Specifically, in regard to the lifter action, as described, the lifters are cammed outwardly during their upward movement to break up bags or other containers of materials and thereby make the materials easier to handle by the screw feeders. For some materials (e.g., sawdust and wood shavings) the lifter movement is changed so that the lifters move or pull down the materials onto the screw feeders.

We claim:

1. A material transferring facility, comprising:
   walls defining an elongated open-topped pit having an open long side, said material being located in said pit;
   a belt conveyor located outwardly of the pit and extending generally parallel along the pit open long side;
   tracks located in said pit and extending lengthwise thereof;
   a wheeled framework mounted on said tracks and adapted for movement along said tracks, said framework including a portion defining a space above the tracks and opening toward the materials in a forward direction of framework movement;
   a screw feeder mounted on said framework and extending within said framework space transversely of said tracks with an end thereof lying outside the pit and over the belt conveyor throughout the complete path of movement of said framework along said tracks;
   means carried by said framework for rotating said screw feeder in such direction as to transfer the material from the pit and out the end of said screw feeder onto the belt conveyor;
   at least one vertically moving closed-loop chain carried by said framework maintained in contact with said materials, fingerlike members pivotally mounted to said chain, and means for camming said members to extend away from said chain into the materials during a part of their movement through the materials; and
   means for selectively driving said closed-loop chain.

2. A material transferring facility as in claim 1, in which there are further provided control means responsive to material blocked passage of the vehicle for stopping said vehicle.

3. A material transferring facility as in claim 1, in which there are further provided means responsive to screw feeder locking for stopping rotation of said screw feeder in the material transferring direction and rotating said feeder in the reverse direction.

4. A material transferring facility as in claim 1, in which said rotating screw feeder includes a pair of meshed broad-thread screws arranged transversely of said pit, and there are further provided means for driving said screws in opposite directions.

* * * * *